Sept. 16, 1969  A. J. GROSZEK  3,467,501
CALORIMETER FOR THE DETERMINATON OF HEATS OF REACTION
Filed June 1, 1965  3 Sheets-Sheet 1

INVENTOR:
ALEKSANDER J. GROSZEK
BY
Browne, Schuyler + Beveridge
ATTORNEYS

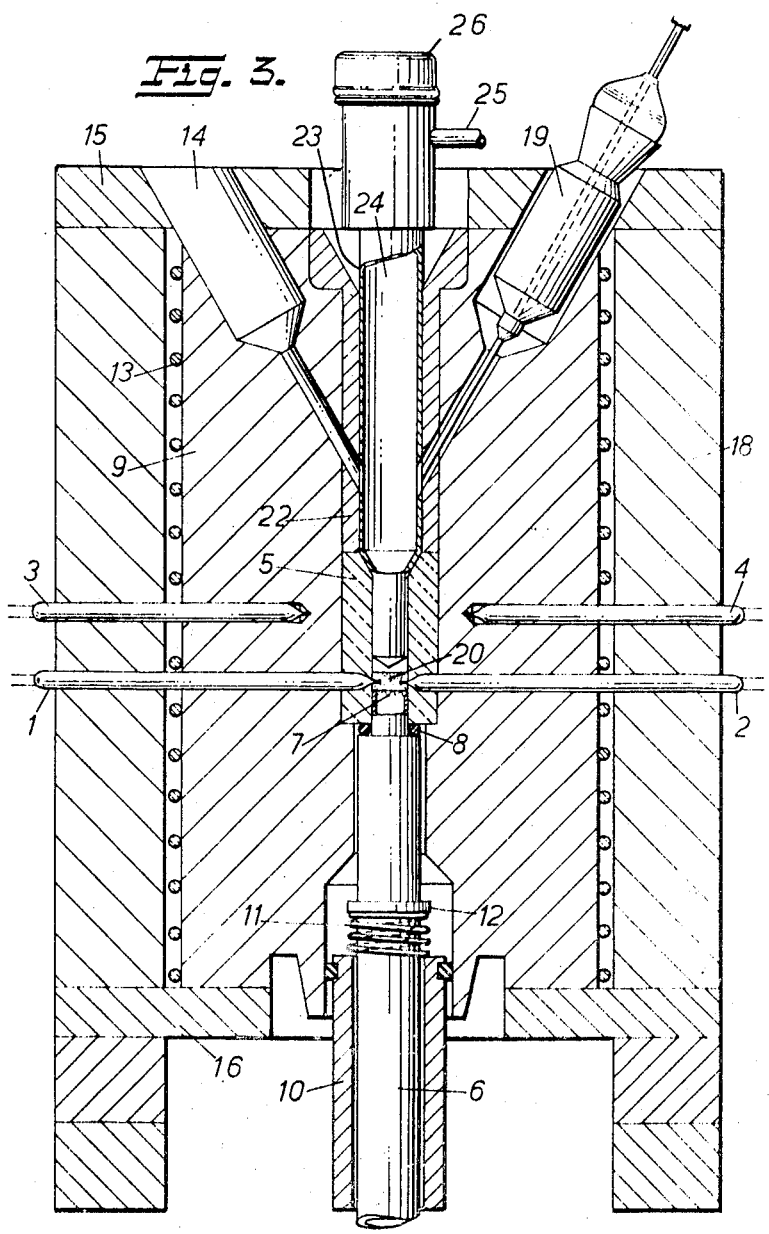

United States Patent Office 3,467,501
Patented Sept. 16, 1969

3,467,501
CALORIMETER FOR THE DETERMINATION OF HEATS OF REACTION
Aleksander Jerzy Groszek, West Ealing, England, assignor to Microscal Limited, London, England
Filed June 1, 1965, Ser. No. 460,315
Claims priority, application Great Britain, June 4, 1964, 23,139/64
Int. Cl. G01n 31/06
U.S. Cl. 23—230                       16 Claims

ABSTRACT OF THE DISCLOSURE

A microcalorimeter for determining the heats of reaction between a fluid and a solid reactant. The solid reactant is contained in a cell through which passes a stream of fluid. At least one measuring thermistor is mounted in the solid reactant zone and its matching reference thermistor is mounted in a block surrounding the cell, means for recording variations in the resistances of the measuring thermistors is provided.

---

Figure 1:
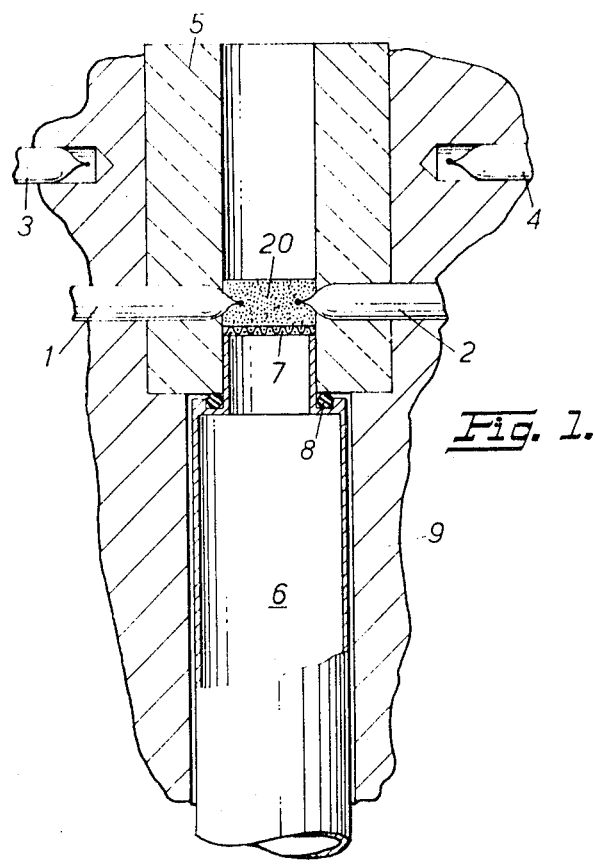

This invention relates to an apparatus and method for the determination of the heat of reaction between a fluid and a solid reactant. More particularly it relates to the determination of heats of interaction at solid/liquid and solid/gas interfaces.

In British specification No. 822,432 (in the name of A. J. Groszek) there is disclosed a method for identifying the constituents of a liquid mixture which comprises passing each fraction through an adsorbent and measuring the temperature rise produced on adsorption of each fraction and an apparatus for carrying out the method which essentially comprises a cell containing an adsorbent and having a thermometer in direct contact with the adsorbent.

The interactions with which the present invention is concerned are those chemical and physical interactions which take place between a solute (reactant) or mixture of solutes (reactants) in the solid phase (hereinafter called the "solid reactants") with either liquid or gaseous phase. This definition includes sorption, i.e. both absorption and adsorption, and in particular it includes the reaction in which one material is sorbed (i.e. absorbed or adsorbed) and a previously sorbed i.e. absorbed or adsorbed) material is released. This type of reaction will hereinbefore be called "preferential sorption" (preferential absorption or adsorption) and when applied to this type of reaction the term "solid reactant" will mean the solid containing the previously sorbed (i.e. absorbed or adsorbed) material.

The object of the present invention is to provide a practical commercial apparatus for and a method of determining heats of reaction as defined above. In this specification the term "heat of reaction" is to be understood as limited to those reactions included in the above definition.

According to the present invention there is firstly provided an apparatus for determining the heat of reaction between a fluid and a solid reactant which comprises a cell for containing the solid reactant in a stream of the fluid, one or more measuring thermistors mounted in the solid reactant zone and means for recording variations in the resistances of the measuring thermistors.

The cell may also contain an electrical heating coil for use during calibration experiments. An important feature of the apparatus, generally referred to as the calorimeter, is the mounting of one reference thermistor in a metal block surrounding the cell, for each measuring thermistor mounted in the solid reactant zone. Preferably each of the measuring thermistors forms a matched pair with one of the reference thermistors. The preferred number of thermistors is four and these may be connected into a Wheatstone bridge circuit, in which case the means for recording the variations in the resistances of the measuring thermistors may take the form of a variable range potentiometric recorder connected so as to record the imbalance of the bridge. The resistance of individual thermistors can vary from 200 to 1,000,000 ohms, but is preferably 2000 ohms. An apparatus according to the present invention is used with a granular solid immersed in a carrier liquid or gas in the cell. A known quantity of a reactant is introduced into the cell by means of a stream of inert liquid or gas and then contacts the solid.

An apparatus according to the present invention may be used to determine heats of reaction as generally defined above but it is particularly suitable for the determination of heats of preferential adsorption and sorption, e.g. the adsorption of benzene on silica gel saturated with n-heptene, or sorption of hydrocarbons by rubber from ethyl alcohol.

When used to determine heats of preferential sorption from solution an apparatus according to the present invention may be provided with a continuous supply of solvent and also with means for the injection of a small measured quantity of solute (usually in the form of a dilute solution) into the stream of solvent before the solvent contacts the solid and sorbent.

In addition to its use in determining heats of reaction an apparatus according to the present invention may also be used to determine the surface areas of solid powders, and it is particularly useful for powders having a surface area lower than one square metre per gram.

The present invention also provides a method of determinating the heat of reaction between a fluid and a solid reactant which comprises passing a stream of fluid through a solid reactant contained in a cell and recording the variation in the resistances of one or more measuring thermistors mounted in the solid reactant. The flow of fluid may be continued after the reaction has ceased and the power required to produce a similar variation in the resistance of the said measuring thermistors by heating the solid reactant by means of an electric heating coil may be recorded.

The passage into the cell of a material which is capable of reacting with the solid reactant causes a change in the temperature of the solid reactant and this, in its turn, causes an alteration in the resistances of the measuring thermistors. Thus, for example, while a pure solvent is passing through the cell the resistances of the measuring thermistors will be recorded as a straight line while the passage of a material which is capable of reacting will cause the record to show a "hump" or "peak." The size and shape of this "hump" or "peak" depends on the heat generated during the reaction its area being proportional to the heat generated in the cell or calorimeter.

The calibration may be effected as follows: a small (electrical) heating coil is placed in the cell and a granular solid is packed around the coil to reproduce as nearly as possible the conditions during the original reaction. Solvent or gas is passed through the cell at the same rate as during the reaction and the apparatus is left to achieve thermal equilibrium (a thermal steady state). An electric current is supplied to the heating coil and the energy input is varied by variation of the voltage and/or amperage. The total input of electrical energy to the coil is proportional to the areas under the peaks up to heat effects 60 millicalories. Conveniently the heating coil is placed in the cell before the reaction; when the reaction is complete the flow of solvent is continued unchanged and the calibration is conducted as described above.

Figure 4:
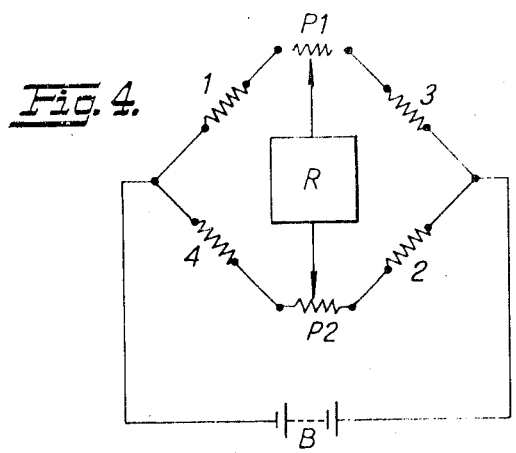
Figure 2:
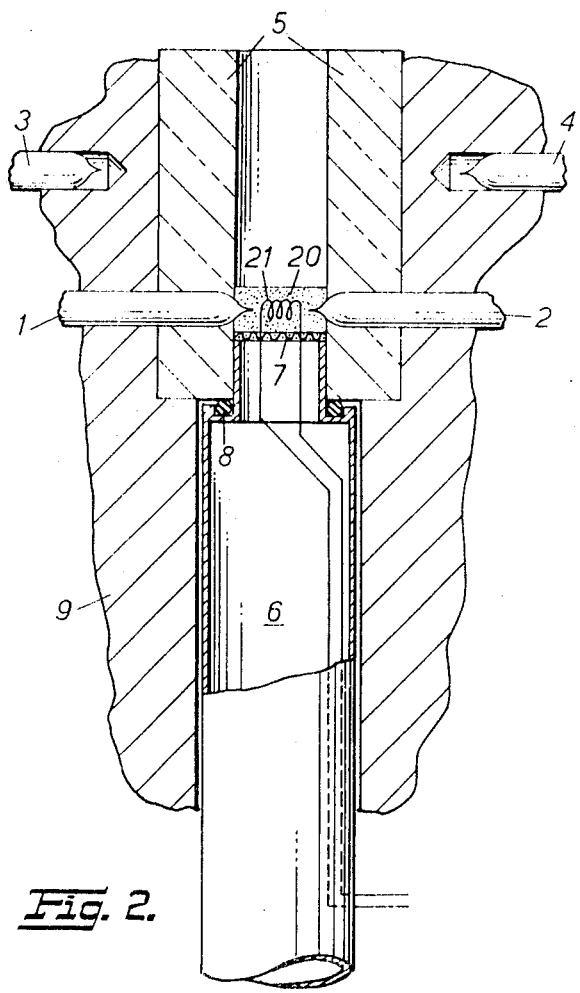

The present invention will now be more particularly described, by way of example, with reference to the accompanying drawings in which:

FIG. 1 illustrates a cell suitable for use in an apparatus according to the present invention, FIG. 2 illustrates a cell as in FIG. 1 showing the calibration coil in position, FIG. 3 illustrates a cell as illustrated in FIGS. 1 and 2, placed in a temperature shield, and FIG. 4 illustrates a Wheatstone bridge circuit containing the four thermistors shown in FIGS. 1 to 3.

The cell shown in FIGS. 1 to 3 consists of a heat insulating body 5 (calorimeter cell) which contains a solid reactant 20. This can be manufactured for example from glass, Teflon ("Teflon" is a trade mark), rubber, ceramic materials or graphite. The fluid for which the heat of reaction is to be determined enters the top of the cell, passes through the solid reactant 20 and leaves the cell via metal gauze-cap 7. An exit tube 6 is pushed against the flat base of cell 5 by spring 11 held by collar 12 attached to exit tube 6. A tight seal is obtained by means of silicone rubber O-ring 8. The bottom of tube 6 is surrounded by cylinder 10 which can be pushed manually against the pressure exerted by spring 11 and so lock the tube 6 in position. The purpose of the gauze cap is to retain the solid reactant 20 in the cell and to prevent its access into exit-tube 6. Two reference thermistors, 3 and 4, are mounted in cavities in the body of metal block 9 surrounding cell 5 and two measuring thermistors 1 and 2 are mounted in the bed of solid reactant 20. Thermistors 1 and 3 are a "matched pair"; that is they display substantially the same temperature/resistance characteristics throughout the temperature range in which they are used. The thermistors 2 and 4 are also a matched pair. Preferably the reference thermistors 3 and 4 are mounted above i.e. upstream of the measuring thermistors 1 and 2. It was discovered that the best positioning of the thermistors is as shown in FIG. 3 and ensures a good thermal stability for the calorimeter. The essence of this arrangement is that the reference thermistors are embedded in the metal block 9 near the wall of the cell which contains the measuring thermistors. Preferably the distance between the reference and measuring thermistors should not exceed 2 cm.

The principle on which the cell operates is that a reaction takes place in the cell and heat is generated so that the temperature of the solid reactant 20 will increase with respect to the body 9. This change in temperature will cause the resistances of the measuring thermistors 1 and 2 to alter with respect to the resistances of the reference thermistors 3 and 4. The changes in resistance may be recorded and the heat generated may be deduced from such changes. The method of recording the resistance changes and the method of calibration will be discussed below. An electrical heating coil 21 is contained in the cell during calibration.

The successful operation of an apparatus according to the present invention depends upon the measurement of small temperature changes which take place in the cell described herein. It is therefore desirable to provide the cell with a temperature shield and this may be provided with heating means so as to permit determinations to be carried out at high temperatures depending on the material being used, e.g. up to 200° C. when Teflon is used.

FIG. 3 shows a cell as described in FIG. 1 mounted in a temperature shield. The cell, which is generally represented by the reference numeral 5 is placed in the centre of a relatively massive metal shield 9, preferably aluminium, which may be provided with an insulating layer 18 to increase the heat stability. The exit-tube 6 is extended below the metal shield 9. The top end of the body of cell 5 makes a tight seal with part 22 fitting into metal block 9. The metal block contains cavities 14 which can accommodate funnels 19 (only one shown in FIG. 3) containing solvent or solution passing through the solid in the cell. The contents of the funnels are thus kept at a temperature close to that of the cell.

A stainless steel tube 24 is inserted into channel 23 in the metal block so as to just contact the surface of adsorbent in the Teflon cell. The tube fits tightly in the channel and serves as the main inlet for the carrier liquid at room temperature. The tube has two openings at the sides situated so as to face the side channels in the block. Carrier liquids issuing from the container situated in cavity 14 can then flow into the tube and along its internal walls to reach the adsorbent. The purpose of using the tube is twofold; (a) it can be easily withdrawn from the cell for cleaning after use with a given solid/liquid system, the cleaning of the walls of the channel being more difficult and (b) it prevents drop formation by certain carrier liquids (especially water) on the walls of the Teflon cell. The top end of tube 24 can be connected to a gas inlet tube 25 in the form of a T piece, which, in turn, can be connected to a source of carrier gas. The top of tube 25 can be closed with a rubber cap (serum cap) 26 through which pulses of gaseous substances can be injected.

If the apparatus is only to be used at room temperature the metal shield 9 together with its insulating layer 18 provides adequate temperature stability. To obtain higher temperatures the metal block is heated and this may be done by means of an inner heating coil 13 wound round the metal shield 9 inside the insulating layer 18. The current passing through the coil must have a stabilized voltage and the amount of heat generated must be continuous and constant. The top and bottom of the temperature shield may be covered with insulating layers 15 and 16.

Temperature measuring instruments e.g. thermocouples (not shown in any of the drawings) may be used to measure the temperature of any or all parts of the temperature shields.

The resistances of the thermistors may be compared by connecting them into a Wheatstone bridge circuit having a battery B of 1.5 to 6 volts. A suitable circuit is illustrated in FIG. 4 in which the thermistors are numbered as in FIG. 1. The bridge is balanced after the cell has achieved thermal equilibrium by means of the potentiometers $P_1$ and $P_2$, each having the resistance of 100 ohms. This adjustment allows no current, or only a small current, to flow through the potentiometric recorder R. Any change of temperature in the cell will cause a change in the resistance of the thermistors 1 and 2. This will upset the balance of the bridge and so cause a current to flow through the galvanometer R. The current is recorded, preferably by using a variable range potentiometric recorder R.

One manner of using the apparatus described above to determine the heat of preferential sorption of a solute from solution by a solid saturated with solvent will now be described. The apparatus is maintained at the temperature at which the determination is to be carried out and carrier liquid is passed into the cell from funnel 19. The attainment of thermal equilibrium is indicated by a steady voltage registered by recorder R. The Wheatstone bridge may be balanced by adjustment of the potentiometers $P_1$ and $P_2$ so that this steady voltage is either zero or small.

When thermal equilibrium has been attained a measured quantity of solute, or a measured quantity of a solution of solute in the solvent, may be injected into the stream of solvent, via solute inlet tube 23, by means of a micrometer syringe. The solute is carried into contact with the adsorbent by the stream of solvent and adsorption or reaction may take place. The heat generated upsets the balance of the bridge causing the recorder to plot a "hump" or "peak." The area of the peak indicates the quantity of heat produced by the adsorption or reaction of the known quantity of solute injected.

The instrument may be calibrated by the use of an electrical heating coil 21 introduced into the cell as shown in FIG. 2.

During calibrating the apparatus is brought into the same conditions as during the corresponding adsorption experiment; that is it is brought to the same temperature, the same amount of adsorbent is placed in the cell and solvent is passed through at the same rate of flow.

The apparatus can be used for the determination of heat of adsorption from gases. Carrier gas can be introduced via tube 23 with cavities 14 sealed.

The present invention is further illustrated by, but is in no manner limited to, the following examples.

EXAMPLE 1.—ADSORPTION ON GRAPHITE FROM n-HEPTANE

Bridge current _____ma__ 1.5
Recorder set at full scale deflection _____mv__ 1.0
Carrier liquid flow _____ml./min__ 0.2

| Solute | Solute Adsorbed, µg. | Peak Area, mm.² | Heat Effect, mcal. | Heat of Adsorption, Cal./g. |
|---|---|---|---|---|
| Dotriacontane | 4 | 136 | 0.42 | 105 |
| Do | 10 | 262 | 0.87 | 87 |
| Do | 20 | 436 | 1.44 | 72 |
| Do | 120 | 1,120 | 3.70 | 31 |

EXAMPLE 2.—INTERACTION WITH ALUMINA IN XYLENE

Bridge current _____ma__ 1.5
Recorder set at full scale deflection _____mv__ 2.0
Carrier liquid flow _____ml./min__ 0.2

| Solute | Solute Adsorbed, µg. | Peak Area, mm.² | Heat Effect, mcal. | Heat of Adsorption, Cal./g. |
|---|---|---|---|---|
| Isobutyl alcohol | 60 | 530 | 3.6 | 60 |
| Acetic acid | 50 | 530 | 3.6 | 72 |
| n-Butylamine | 60 | 1,060 | 7.2 | 125 |
| Benzene | 180 | 80 | 0.5 | 3 |
| n-Octadecanol | 100 | 800 | 5.4 | 54 |

EXAMPLE 3.—ADSORPTION ON HUMAN TOOTH ENAMEL FROM 95% ETHANOL, 5% WATER

Bridge current _____ma__ 1.5
Recorder set at full scale deflection _____mv__ 0.2
Carrier liquid flow _____ml./min__ 0.1

| Solute | Solute Adsorbed, µg. | Peak Area, mm.² | Heat Effect, mcal. | Heat of Adsorption, Cal./g. |
|---|---|---|---|---|
| Acetic acid | 5 | 430 | 0.55 | 110 |
| Do | 40 | 1,880 | 2.50 | 65 |
| Lactic acid | 6 | 326 | 0.44 | 70 |
| Citric acid | 4 | 228 | 0.30 | 65 |
| Sulphuric acid | 4 | 262 | 0.35 | 80 |
| Ammonium fluoride | 4 | 560 | 0.72 | 180 |

EXAMPLE 4.—ADSORPTION FROM DRY NITROGEN ON CARBONISED COAL

Bridge current _____ma__ 0.05
Recorder set at _____mv__ 1.0
Carrier gas flow _____mls./minute__ 50

| Adsorbate | Amount Adsorbed, µg. | Peak Area, mm.² | Heat Evolved, mcal. | Heat of Adsorption, Cal./g. |
|---|---|---|---|---|
| $O_2$ | 0.4 | 20 | 1.4 | 3.5 |
| $O_2$ | 1.2 | 50 | 3.5 | 3.4 |
| Moist air | 1.4 | 100 | 6.9 | 4.9 |
| Acetone vapour | 2.4 | 90 | 6.2 | 2.6 |

I claim:
1. Apparatus for determining the heat of reaction between a fluid and a solid reactant which comprises a cell having a solid reactant zone for containing the solid reactant in a stream of fluid, measuring thermistors mounted in the solid reactant zone, one reference thermistor for each said measuring thermistor, said reference thermistors being mounted in a block surrounding the cell, each of the measuring thermistors forming a matched pair with its reference thermistor.

2. An apparatus according to claim 1 in which the maximum distance between the reference and measuring thermistors is 2 cm.

3. An apparatus according to claim 1 which is provided with means for the introduction of gaseous carriers and reagents.

4. An apparatus as claimed in claim 1 in which the resistance of individual thermistors is from 200 to 1,000,000 ohms.

5. An apparatus as claimed in claim 1 in which the resistance of individual thermistors is 2000 ohms.

6. Apparatus according to claim 1 wherein the measuring thermistors are located at least midway along the stream of fluid within the reactant zone.

7. Apparatus according to claim 1 having an electrical heating coil in the cell for use during calibration experiments.

8. Apparatus according to claim 1 having means outside the cell for heating said block.

9. Apparatus according to claim 1 having a Wheatstone bridge circuit having a pair of branches with each branch including a said matched pair of thermistors, and means for measuring any imbalance of the bridge.

10. Apparatus according to claim 9 wherein the measuring means is a variable potentiometric recorder.

11. Apparatus according to claim 1 wherein the block is formed of metal.

12. An apparatus according to claim 11 in which there are two cavities in said metal block for accommodation of vessels with carrier liquid and for maintaining said liquid at a temperature close to that of said solid reactant in said cell.

13. An apparatus according to claim 11 in which there is a central vertical channel in said metal block, a tube constructed from a chemically resistant material inserted in said channel and said tube having a lower end just contacting the surface of said reactant in said cell.

14. An apparatus according to claim 11 is which there is an exit tube passing into said metal block, one end of said exit tube entering a vertical channel in the lower part of said metal block to support the cell so as to position the solid reactant with respect to the thermistors.

15. An apparatus according to claim 11 is which there is an exit tube passing into said metal block, one end of said exit tube entering a vertical channel in the lower part of said metal block to support the cell so as to position the solid reactant with respect to the thermistors, said exit tube being provided with an attached calibration coil placed in the centre of said solid reactant.

16. Apparatus for determining the heat of reaction between a fluid and a solid reactant which comprises a cell having a solid reactant zone for containing the solid reactant in a stream of fluid, a pair of measuring thermistors located at least midway along the stream of fluid within the reactant zone, two reference thermistors located outside the reactant zone, a Wheatstone bridge circuit having a pair of branches with each branch including a measuring thermistor and a reference thermistor, and a variable potentiometric recorder for measuring any imbalance of the bridge.

References Cited
UNITED STATES PATENTS 1,594,593  8/1926  Boertlein _____ 73—190

OTHER REFERENCES

Groszek A.: J. Chromatog., 3, 454–463 (1960).
Groszek A.: ASLE Transactions, 5, 105–114 (1962).

MORRIS O. WOLK, Primary Examiner
S. MARANTZ, Assistant Examiner

U.S. Cl. X.R.

73—190; 323—75